United States Patent
Okamoto et al.

(10) Patent No.: US 12,009,115 B2
(45) Date of Patent: Jun. 11, 2024

(54) CONDUCTOR MATERIAL

(71) Applicants: THE UNIVERSITY OF TOKYO, Tokyo (JP); DAICEL CORPORATION, Osaka (JP)

(72) Inventors: Toshihiro Okamoto, Tokyo (JP); Tadanori Kurosawa, Tokyo (JP); Yu Yamashita, Tokyo (JP); Junichi Takeya, Tokyo (JP); Daiji Ikeda, Tokyo (JP); Takeshi Yokoo, Tokyo (JP); Yasuyuki Akai, Tokyo (JP)

(73) Assignees: THE UNIVERSITY OF TOKYO, Tokyo (JP); DAICEL CORPORATION, Osaka (JP)

( * ) Notice: Subject to any disclaimer, the term of this patent is extended or adjusted under 35 U.S.C. 154(b) by 0 days.

(21) Appl. No.: 17/922,108

(22) PCT Filed: Apr. 27, 2021

(86) PCT No.: PCT/JP2021/016730
§ 371 (c)(1),
(2) Date: Oct. 28, 2022

(87) PCT Pub. No.: WO2021/221039
PCT Pub. Date: Nov. 4, 2021

(65) Prior Publication Data
US 2023/0170107 A1    Jun. 1, 2023

(30) Foreign Application Priority Data

May 1, 2020    (JP) ................. 2020-081349

(51) Int. Cl.
*H01B 1/00*    (2006.01)
*H01B 1/12*    (2006.01)

(52) U.S. Cl.
CPC ................. *H01B 1/127* (2013.01)

(58) Field of Classification Search
CPC .......... H01B 1/00; H01B 1/124; H01B 1/127; C09D 5/24
See application file for complete search history.

(56) References Cited

U.S. PATENT DOCUMENTS 9,396,831 B2 * 7/2016 Ohya ................. C07D 498/22
10,239,886 B2 * 3/2019 Kashiki ............... H10K 85/151
(Continued)

FOREIGN PATENT DOCUMENTS

JP    2010-90217 A      4/2010
JP    2012253067    * 12/2012

OTHER PUBLICATIONS

Jia et al "Tunable Conducting Polymers: Toward Sustainable and Versatile Batteries", ACS Sustainable Chem. Eng. 2019, 7, 14321-14340.*

(Continued)

*Primary Examiner* — Mark Kopec
(74) *Attorney, Agent, or Firm* — Birch, Stewart, Kolasch & Birch, LLP

(57) ABSTRACT

Provided is a conductor material having high conductivity. The conductor material according to an embodiment of the present disclosure has a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation. The anion is preferably an anion represented by Formula (1) below: where $R^1$ and $R^2$ are identical or different, and each represent an electron withdrawing group; and $R^1$ and $R^2$ may be bonded to each other to form a ring with an adjacent nitrogen atom.

(Continued)

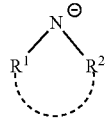

(I)

19 Claims, 2 Drawing Sheets

(56) References Cited

U.S. PATENT DOCUMENTS

2003/0067000 A1* 4/2003 Nelles .................. H10K 71/30
257/458

2017/0186958 A1* 6/2017 Yoshikawa ............ C08K 3/045
2019/0217648 A1* 7/2019 Katsumoto .......... B41M 5/3858

OTHER PUBLICATIONS

Mei et al "Side Chain Engineering in Solution-Processable Conjugated Polymers", Chem. Mater. 2014, 26, 604-615.*
English language machine translation of JP 2010090217 (pub Oct. 2008).*
Fujimoto et al., "Control of Molecular Doping in Conjugated Polymers by Thermal Annealing", Organic Electronics, vol. 47, 2017, pp. 139-146.
International Search Report for International Application No. PCT/JP2021/016730, dated Jun. 29, 2021, with an English translation.
Written Opinion of the International Searching Authority for International Application No. PCT/JP2021/016730, dated Jun. 29, 2021, with an English translation.

* cited by examiner

CONDUCTOR MATERIAL

TECHNICAL FIELD

The present disclosure relates to a novel conductor material, a method for producing the conductor material, and an electronic device provided with the conductor material. The present application claims priority from the Japanese Patent Application No. 2020-081349 filed in Japan on May 1, 2020, the content of which is incorporated herein by reference.

BACKGROUND ART

A conjugated polymeric compound has advantages of light weight and excellent moldability, and is utilized as a variety of electronic device materials. Furthermore, the conjugated polymeric compound is doped with a dopant, and thus can acquire high conductivity.

The dopant includes a donor (i.e., an N-type dopant) that injects electrons as a carrier, and an acceptor (i.e., a P-type dopant) that extracts electrons and forms holes.

As a typical acceptor, 2,3,5,6-tetrafluoro-7,7,8,8-tetracyanoquinodimethane ($F_4$-TCNQ) is known. For example, Non-Patent Literature 1 describes an example in which PBTTT-C16 (poly[2,5-bis(3-hexadecylthiophen-2-yl)thieno[3,2-b]thiophene]), which is a conjugated polymeric compound, is doped with $F_4$-TCNQ to prepare a conductor material.

CITATION LIST

Non-Patent Literature

Non-Patent Literature 1: R. Fujimoto et al. Org. Electron. 47 (2017), 139-146

SUMMARY OF INVENTION

Technical Problem

However, it has been found that the PBTTT-C16 described in Non-Patent Literature 1 is not readily oxidized, and, even once oxidized, is easily reduced by heating or the like. That is, it has been found that the PBTTT-C16 has low doping efficiency, and that a conductor material produced using the PBTTT-C16 has low conductivity.

Accordingly, an object of the present disclosure is to provide a conductor material having high conductivity.

Another object of the present disclosure is to provide a method for producing the conductor material having high conductivity.

Yet another object of the present disclosure is to provide an electronic device provided with the conductor material having high conductivity.

Solution to Problem

As a result of diligent research to solve the above-described problems, the present inventors have found that a conjugated polymeric compound having an electron donating group containing a heteroatom in a side chain is readily oxidized, and, after being oxidized, is hardly reduced; and that a conductor material, produced by doping the conjugated polymeric compound having an electron donating group containing a heteroatom in a side chain with a dopant having a certain anion, has excellent conductivity. The present disclosure has been completed based on these findings.

That is, the present disclosure provides a conductor material having a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation.

The present disclosure also provides the conductor material, wherein the anion is represented by Formula (1) below:

[Chem. 1]

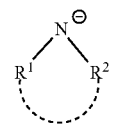

where $R^1$ and $R^2$ are identical or different, and each represent an electron withdrawing group; and $R^1$ and $R^2$ may be bonded to each other to form a ring with an adjacent nitrogen atom.

The present disclosure also provides the conductor material, wherein the anion is represented by Formula (1a) below:

[Chem. 2]

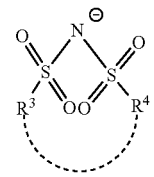

where $R^3$ and $R^4$ are identical or different, and each represent a halogen atom or a haloalkyl group; and $R^3$ and $R^4$ may be bonded to each other to form a haloalkylene group.

The present disclosure also provides the conductor material, wherein the conjugated polymeric compound is a polymeric compound having a repeating unit represented by Formula (2) below:

[Chem. 3]

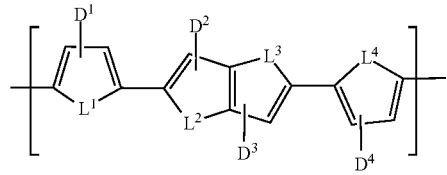

where $L^1$ to $L^4$ are identical or different, and each represent an element of Groups 13 to 16; and $D^1$ to $D^4$ are identical or different, and each represent an electron donating group containing a heteroatom, or a hydrogen atom, provided that at least one of $D^1$ to $D^4$ is an electron donating group containing a heteroatom.

The present disclosure also provides the conductor material, wherein the electron donating group containing a heteroatom is represented by Formula (d) below:

[Chem. 4]

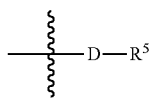

(d)

where D represents at least one heteroatom selected from elements of Groups 14 to 16; $R^5$ represents an aliphatic hydrocarbon group having from 5 to 30 carbon atoms; and a bond indicated by a wavy line in the formula is bonded to a backbone of the conjugated polymeric compound.

The present disclosure also provides a method for producing a conductor material, the method including doping a conjugated polymeric compound having an electron donating group containing a heteroatom in a side chain with a dopant containing an anion selected from a nitrogen anion, a boron anion, a phosphorus anion and an antimony anion, and a counter cation, to produce the conductor material.

The present disclosure also provides the method for producing a conductor material, wherein the anion is represented by Formula (1) below:

[Chem. 5]

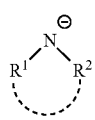

(1)

where $R^1$ and $R^2$ are identical or different, and each represent an electron withdrawing group; and $R^1$ and $R^2$ may be bonded to each other to form a ring with an adjacent nitrogen atom.

The present disclosure also provides the method for producing a conductor material, wherein the anion is represented by Formula (1a) below:

[Chem. 6]

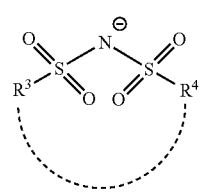

(1a)

where $R^3$ and $R^4$ are identical or different, and each represent a halogen atom or a haloalkyl group; and $R^3$ and $R^4$ may be bonded to each other to form a haloalkylene group.

The present disclosure also provides the method for producing a conductor material, wherein the conjugated polymeric compound is a polymeric compound having a repeating unit represented by Formula (2) below:

[Chem. 7]

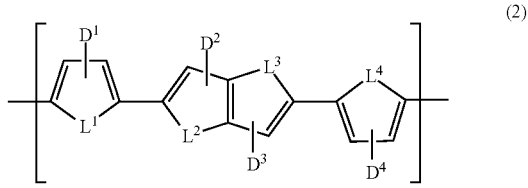

(2)

where $L^1$ to $L^4$ are identical or different, and each represent an element of Groups 13 to 16; and $D^1$ to $D^4$ are identical or different, and each represent an electron donating group containing a heteroatom, or a hydrogen atom, provided that at least one of $D^1$ to $D^4$ is an electron donating group containing a heteroatom.

The present disclosure also provides the method for producing a conductor material, wherein the electron donating group containing a heteroatom is represented by Formula (d) below:

[Chem. 8]

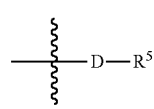

(d)

where D represents at least one heteroatom selected from elements of Groups 14 to 16; $R^5$ represents an aliphatic hydrocarbon group having from 5 to 30 carbon atoms; and a bond indicated by a wavy line in the formula is bonded to a backbone of the conjugated polymeric compound.

The present disclosure also provides the method for producing a conductor material, wherein the counter cation contained in the dopant is a radical cation represented by Formula (3) below:

[Chem. 9]

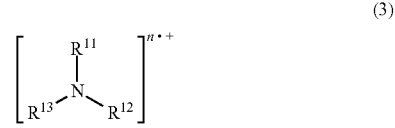

(3)

where $R^{11}$ to $R^{13}$ are identical or different, and each represent a monovalent aromatic group or a group represented by Formula (r) below; and n represents valence of the radical cation and is equal to the number (n) of nitrogen atoms in the formula:

[Chem. 10]

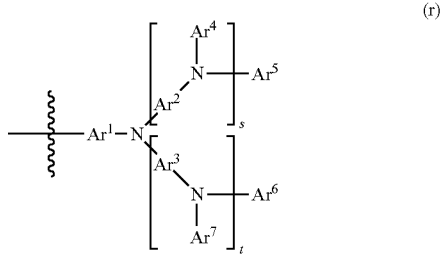

(r)

where $Ar^1$, $Ar^2$, and $Ar^3$ are identical or different, and each represent a divalent aromatic group; $Ar^4$, $Ar^5$, $Ar^6$, and $Ar^7$ are identical or different, and each represent a monovalent aromatic group which may have a substituent represented by Formula (sb) below; s and t are identical or different, and each represent an integer of 0 or greater; and a bond indicated by a wavy line in the formula is bonded to the nitrogen atom in Formula (3),

[Chem. 11]

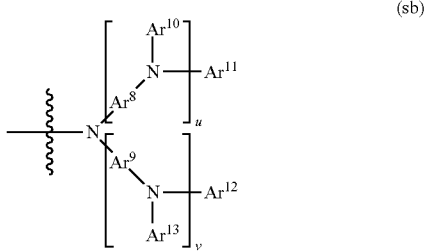

(sb)

where $Ar^8$ and $Ar^9$ are identical or different, and each represent a divalent aromatic group; $Ar^{10}$, $Ar^{11}$, $Ar^{12}$, and $Ar^{13}$ are identical or different, and each represent a monovalent aromatic group; u and v are identical or different, and each represent an integer of 0 or greater; and a bond indicated by a wavy line in the formula is bonded to the monovalent aromatic group.

The present disclosure also provides an electronic device including the conductor material.

Advantageous Effects of Invention

The conductor material according to an embodiment of the present disclosure has a high dope amount, and, besides, is not readily to be dedoped. Therefore, it has high conductivity. The conductor material has high crystallinity. Further, the conductor material is flexible. The conductor material can be used to form a film by a simple method, and the conductor material with a large area can be easily made. Accordingly, the conductor material can be suitably used in the production of an electronic device which is lightweight, thin, and flexible, and has a large area and the like, while suppressing cost.

In addition, with an electronic device including the conductor material, weight reduction, flexibility, thickness reduction, and area increase, in addition to high conductivity and high stability (stable against heat, water, electricity, and the like) can be easily attained.

DESCRIPTION OF EMBODIMENTS

Conductor Material

Figure 1:
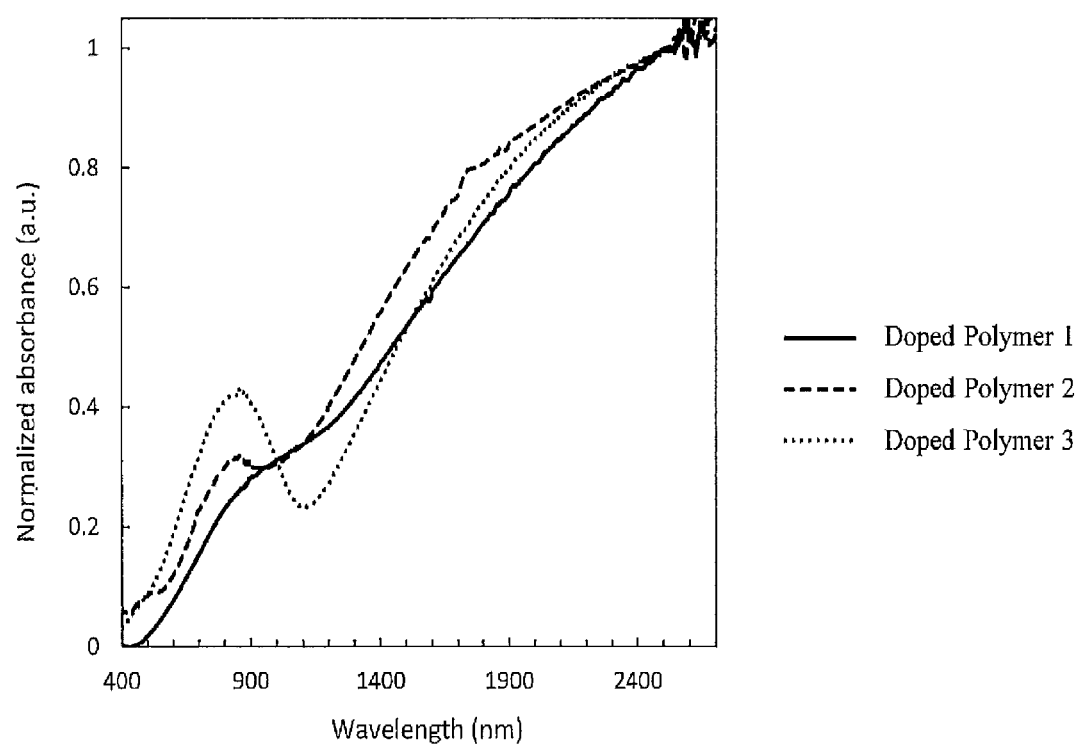
FIG. 1 is a diagram illustrating ultraviolet visible near-infrared absorption spectra of conductor materials obtained in Examples and a Comparative example (i.e. conjugated polymeric compounds after being doped with a dopant).

A conductor material according to an embodiment of the present disclosure has a configuration in which a conjugated polymeric compound having an electron donating group containing a heteroatom in a side chain (or having the group as a side chain) is doped with a dopant containing an anion selected from a nitrogen anion, a boron anion, a phosphorus anion and an antimony anion, and a counter cation.

The conductor material is preferably a p-type conductor material.

The conductor material preferably has a configuration in which the anion is placed in a gap of a crystalline structure of a conjugated polymeric compound having an electron donating group containing a heteroatom in a side chain. Thus, the conductor material has high crystallinity, and dedoping is suppressed.

The conductor material exhibits high conductivity. A conductivity of the conductor material is, for example, 250 S/cm or greater, preferably 280 S/cm or greater, particularly preferably 300 S/cm or greater, most preferably 305 S/cm or greater, and especially preferably 310 S/cm or greater. Therefore, it can be suitably used as an electronic device material and an electrode material of a secondary battery.

The conductor material is excellent in storage stability and can maintain high conductivity over a long period of time. For example, a ratio of decrease in conductivity after storage at room temperature (25° C.) for 14 days [(conductivity before storage−conductivity after storage for 14 days)/conductivity before storage×100] is 5% or less, preferably 3% or less, and particularly preferably 1% or less.

A ratio of decrease in conductivity after storage at room temperature (25° C.) for 56 days [(conductivity before storage−conductivity after storage for 56 days)/conductivity before storage×100] is 20% or less, preferably 15% or less, and particularly preferably 10% or less.

Also, the conductor material is flexible. Furthermore, it can be used to form a film by a simple method (e.g., injection molding, extrusion method, casting method, powder molding method, or the like), and the conductor material with a large area can be easily made. Accordingly, the conductor material can be suitably used in the production of an electronic device which is lightweight, thin, and flexible, and has a large area and the like, while suppressing cost.

[Method for Producing Conductor Material]

The conductor material can be produced, for example, by doping a conjugated polymeric compound having an electron donating group containing a heteroatom in a side chain with a dopant containing an anion selected from a nitrogen anion, a boron anion, a phosphorus anion and an antimony anion, and a counter cation, to produce the conductor material.

Examples of a method of doping the conjugated polymeric compound with a dopant include a method of forming a coating film containing the dopant (a thickness of the dopant coating film is, for example, from 10 to 200 nm, and preferably from 30 to 100 nm) on a surface of the conjugated polymeric compound by a method according to a dry process or a method according to a wet process.

Examples of the method according to a dry process include a method of depositing a dopant to a surface of the conjugated polymeric compound (e.g., a film, a sheet, a coating film, or the like with a thickness of approximately from 10 to 500 nm, which includes a conjugated polymeric compound having an electron donating group containing a heteroatom in a side chain) by vacuum vapor deposition, sputtering method, or the like.

Examples of the method according to a wet process include a method of immersing the conjugated polymeric compound in a composition in which a dopant is dissolved and/or dispersed in a solvent or applying the composition to a surface of the conjugated polymeric compound, and then removing the solvent. After drying, an annealing treatment may be performed as necessary.

The conjugated polymeric compound is doped with the dopant, and the counter cation constituting the dopant extracts electrons from the conjugated polymeric compound. This creates holes serving as charge carriers, and thus conductivity is exhibited.

The counter cation is converted to a neutral compound upon extraction of electrons from the conjugated polymeric compound. This neutral compound is excluded from the system of the conjugated polymeric compound.

The anion is released from an ionic bond with the counter cation when the counter cation is converted to a neutral compound. Then, the anion is stably placed in a gap of the crystalline structure of the conjugated polymeric compound. Thus, the crystallinity of the conjugated polymeric compound is enhanced, and dedoping is suppressed.

Dopant

The dopant contains an anion selected from nitrogen anions, boron anions, phosphorus anions, and antimony anions and a counter cation. The dopant may be a metal compound or a metal complex.

The dopant acts as a P-type dopant.

Anion

The anion is an anion selected from nitrogen anions, boron anions, phosphorus anions, and antimony anions.

Among them, the nitrogen anion is preferable as the anion from the perspective of an excellent dedoping suppressing effect. This is because, after being released from the ionic bond with the counter cation, the anion is stably placed in the gap of the crystalline structure of the conjugated polymeric compound, and thus the effect of enhancing the crystallinity of the conjugated polymeric compound is exhibited.

Thus, the anion is preferably an anion represented by Formula (1) below:

[Chem. 12]

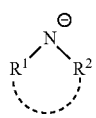

(1)

where $R^1$ and $R^2$ are identical or different, and each represent an electron withdrawing group; and $R^1$ and $R^2$ may be bonded to each other to form a ring with an adjacent nitrogen atom.

Examples of the electron withdrawing group include a nitro group, a cyano group, a ($C_{1-5}$) acyl group, a carboxyl group, a ($C_{1-5}$) alkoxycarbonyl group, a halo ($C_{1-5}$) alkyl group, a sulfo group, a ($C_{1-5}$) alkylsulfonyl group, a halosulfonyl group, and a halo ($C_{1-5}$) alkylsulfonyl group.

As $R^1$ and $R^2$, above all, a halosulfonyl group, a haloalkylsulfonyl group, or a sulfonyl-haloalkylene-sulfonyl group in which $R^1$ and $R^2$ are bonded to each other is preferable.

Examples of the halosulfonyl group include a fluorosulfonyl group and a chlorosulfonyl group.

Examples of the haloalkylsulfonyl group include fluoroalkylsulfonyl groups (e.g., fluoro $C_{1-5}$ alkylsulfonyl groups such as a fluoromethylsulfonyl group, a trifluoroethylsulfonyl group, a trifluoropropylsulfonyl group, and a pentafluoropropylsulfonyl group; and perfluoro $C_{1-5}$ alkylsulfonyl groups such as a trifluoromethylsulfonyl group, a pentafluoroethylsulfonyl group, a pentafluoropropylsulfonyl group, and a nonafluorobutylsulfonyl group); and chloroalkylsulfonyl groups (e.g., chloro $C_{1-5}$ alkylsulfonyl groups such as a chloromethylsulfonyl group).

Examples of the haloalkylene group in the sulfonyl-haloalkylene-sulfonyl group formed by bonding $R^1$ and $R^2$ to each other include fluoroalkylene groups (e.g., perfluoro $C_{1-5}$ alkylene groups such as a tetrafluoroethylene group, a hexafluoropropane-1,3-diyl group, and an octafluorobutane-1,4-diyl group), and chloroalkylene groups (e.g., perchloro $C_{1-5}$ alkylene groups).

The anion is especially preferably an anion represented by Formula (1a) below:

[Chem.13]

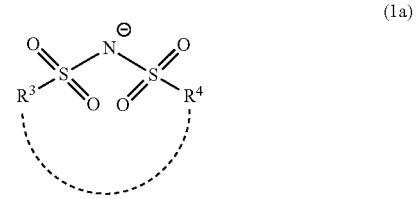

(1a)

where $R^3$ and $R^4$ are identical or different, and each represent a halogen atom or a haloalkyl group; and $R^3$ and $R^4$ may be bonded to each other to form a haloalkylene group.

Examples of the haloalkyl group include fluoroalkyl groups (e.g., fluoro $C_{1-5}$ alkyl groups such as a fluoromethyl group, a trifluoroethyl group, a trifluoropropyl group, and a pentafluoropropyl group; perfluoro $C_{1-5}$ alkyl groups such as a trifluoromethyl group, a pentafluoroethyl group, a pentafluoropropyl group, and a nonafluorobutyl group); and chloroalkyl groups (e.g., chloro $C_{1-5}$ alkyl groups such as a chloromethyl group).

Examples of the haloalkylene group include fluoroalkylene groups (e.g., perfluoro $C_{1-5}$ alkylene groups such as a tetrafluoroethylene group, a hexafluoropropane-1,3-diyl group, and an octafluorobutane-1, 4-diyl group) and chloroalkylene groups (e.g., a perchloro $C_{1-5}$alkylene group).

Counter Cation

The counter cation is not particularly limited as long as it is a cation that acts to withdraw electrons from the conjugated polymeric compound, but, above all, a radical cation represented by Formula (3) below is preferable, from the perspective of having an excellent oxidizing power and easily extracting electrons from the conjugated polymeric compound. In particular, a compound represented by Formula (3) below, wherein at least one of $R^{11}$ to $R^{13}$ is a group represented by Formula (r) below, is preferable.

[Chem. 14]

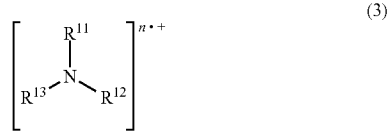

where $R^{11}$ to $R^{13}$ are identical or different, and each represent a monovalent aromatic group or a group represented by Formula (r) below; and n represents valence of the radical cation and is equal to the number (n) of nitrogen atoms in Formula (3):

[Chem. 15]

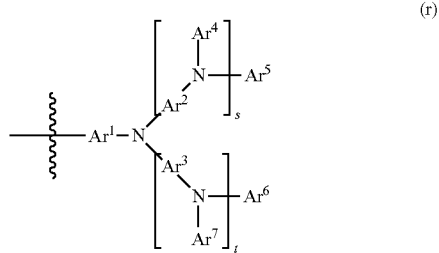

where $Ar^1$, $Ar^2$, and $Ar^3$ are identical or different, and each represent a divalent aromatic group; $Ar^4$, $Ar^5$, $Ar^6$, and $Ar^7$ are identical or different, and each represent a monovalent aromatic group which may have a substituent represented by Formula (sb) below; s and t are identical or different, and each represent an integer of 0 or greater; and a bond indicated by a wavy line in the formula is bonded to the nitrogen atom in Formula (3),

[Chem. 16]

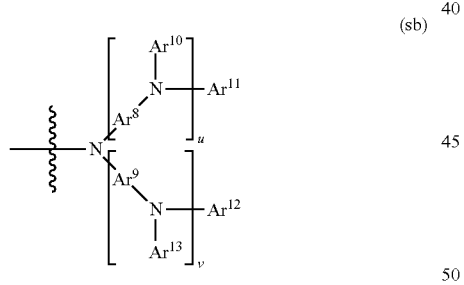

where $Ar^8$ and $Ar^9$ are identical or different, and each represent a divalent aromatic group; $Ar^{10}$, $Ar^{11}$, $Ar^{12}$, and $Ar^{13}$ are identical or different, and each represent a monovalent aromatic group; u and v are identical or different, and each represent an integer of 0 or greater; and a bond indicated by a wavy line in the formula is bonded to the monovalent aromatic group.

When s, t, u, and v are each an integer of 2 or greater, there are a plurality of groups that are put in parentheses. These groups may be identical or different.

s, t, u, and v each represent an integer of 0 or greater, and are, for example, from 0 to 5, preferably from 0 to 3, and particularly preferably from 0 to 2. As the values of s, t, u, and v increase, the doping efficiency with respect to the conjugated polymeric compound is improved, and the crystallinity of the conjugated polymeric compound after doping tends to improve.

The monovalent aromatic group is a group having the structural formula of the aromatic compound with one hydrogen atom removed [more specifically, an aromatic group with one hydrogen atom removed, the hydrogen atom binding to a carbon atom that constitutes the aromatic compound (a carbon atom or a heteroatom that constitutes the aromatic compound, in a case where the aromatic compound is an aromatic heterocycle)]].

Also, the divalent aromatic group is a group having a structural formula of the aromatic compound with two hydrogen atoms removed [more specifically, an aromatic group with two hydrogen atoms removed, the hydrogen atoms binding to a carbon atom that constitutes the aromatic compound (a carbon atom or a heteroatom that constitutes the aromatic compound, in a case where the aromatic compound is an aromatic heterocycle)].

The aromatic compound includes aromatic hydrocarbons and aromatic heterocycles.

Examples of the aromatic hydrocarbons include aromatic hydrocarbon rings having from 6 to 14 carbons such as benzene and naphthalene, and structural bodies in which two or more of the aromatic hydrocarbon rings are bonded through a single bond or a linking group.

Examples of the linking group include a $C_{1-5}$ alkylene group, a carbonyl group (—CO—), an ether bond (—O—), a thioether bond (—S—), an ester bond (—COO—), an amide bond (—CONH—), and a carbonate bond (—OCOO—).

Among them, the aromatic hydrocarbon is preferably at least one selected from aromatic hydrocarbons represented by Formulas (ar-1) to (ar-6) below.

[Chem. 17]

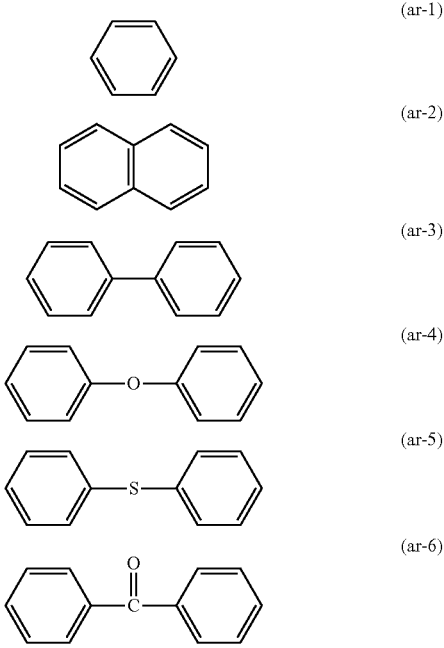

Examples of the aromatic heterocycle include monocyclic aromatic heterocycles having a carbon atom and at least one heteroatom (e.g., an oxygen atom, a sulfur atom, a nitrogen atom, a phosphorus atom, or the like) as an atom constituting the ring, and fused rings in which one or two or more aromatic hydrocarbon rings are fused with the monocyclic aromatic heterocycles. Specific examples include pyrrole, furan, thiophene, phosphole, pyrazole, imidazole, oxazole, isoxazole, thiazole, indole, benzofuran, benzothiophene, isoindole, isobenzofuran, benzophosphole, benzimidazole, benzoxazole, benzothiazole, benzisoxazole, indazole, benzisothiazole, benzotriazole, purine, pyridine, phosphinine, pyrimidine, pyrazine, pyridazine, triazine, 1,2,4,5-tetrazine, 1,2,3,4-tetrazine, 1,2,3,5-tetrazine, hexazine, quinoline, isoquinoline, quinoxaline, quinazoline, cinnoline, pteridine, phthalazine, acridine, 4aH-phenoxazine, and carbazole.

The monovalent aromatic group and the divalent aromatic group may have a substituent. Examples of the substituent include a halogen atom, a $C_{1-5}$ alkyl group, an oxo group, a hydroxyl group, a substituted oxy group (e.g., a $C_{1-5}$ alkoxy group or a $C_{1-5}$ acyloxy group), a carboxyl group, a substituted oxycarbonyl group (e.g., a $C_{1-5}$ alkoxycarbonyl group), a substituted or unsubstituted carbamoyl group, a cyano group, a nitro group, an amino group, and a substituted amino group (e.g., a mono- or di-$C_{1-5}$ alkylamino group or a mono- or di-$C_{1-5}$ acylamino group). Among the substituents, a halogen atom is preferred, and a bromine atom is particularly preferred.

Furthermore, the monovalent aromatic group may have, in addition to the substituent described above, a group represented by the following Formula (sb-1), for example.

[Chem. 18]

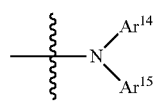

(sb-1)

where $Ar^{14}$ and $Ar^{15}$ are identical or different, and each represent a monovalent aromatic group; and a bond indicated by a wavy line in the formula is bonded to a carbon atom constituting the aromatic compound (in a case where the aromatic compound is an aromatic heterocycle, a carbon atom or a heteroatom).

Examples of the monovalent aromatic group in $Ar^{14}$ and $Ar^{15}$ in the formula above include the same examples as described above.

Method for Producing Dopant

For example, the dopant containing the nitrogen anion represented by Formula (1) (hereinafter, sometimes referred to as "nitrogen anion (1)") and a radical cation represented by Formula (3) where $R^{11}$ to $R^{13}$ are identical or different, and each represent a monovalent aromatic group (hereinafter, sometimes referred to as "radical cation (3a)") can be produced via the following step [1].

[1]: reacting an ionic compound containing the nitrogen anion (1) and an amine compound corresponding to the radical cation (3a) in the presence of an oxidizer.

The ionic compound and the amine compound each can be used alone or two or more in combination.

Examples of the ionic compound include an ionic compound containing a nitrogen anion and a monovalent metal ion. Examples of the metal ion include alkali metals such as $Li^+$ and $Na^+$; alkaline earth metals such as $Mg^{2+}$ and $Ca^{2+}$; and transition metals such as $Cu^+$, $Ag^+$, and $Au^+$.

The ionic compound is, for example, preferably a monovalent metal salt of TFSI⁻ such as bis(trifluoromethanesulfonyl)imide silver (AgTFSI).

Examples of the amine compound include tris(halophenyl)amine such as tris(p-bromophenyl)amine.

An amount of the ionic compound used is, for example, approximately from 1 to 5 mol per mole of the amine compound.

Examples of the oxidizer include $NOPF_6$, iron trichloride ($FeCl_3$), and simple halogen substances (e.g., iodine $I_2$, bromine $Br_2$, and chlorine $Cl_2$). One of these can be used alone or two or more in combination.

An amount of the oxidizer used is, for example, approximately from 1 to 5 mol per mole of the amine compound.

Furthermore, the reaction in step [1] can be performed in the presence of a solvent. Examples of the solvent include nitrile-based solvents such as acetonitrile, propionitrile, and benzonitrile; water; alcohol-based solvent such as methanol; amide-based solvents such as N,N-dimethylformamide and N,N-dimethylacetamide; ether based solvents such as diethyl ether, THF, and dioxane; and ester-based solvents such as ethyl acetate. One of these can be used alone or two or more in combination.

A reaction atmosphere in step [1] is any atmosphere that does not inhibit the reaction and not particularly limited, and may be, for example, any of an air atmosphere, a nitrogen atmosphere, and an argon atmosphere.

A reaction temperature in step [1] is, for example, approximately from −70 to 60° C. A reaction time is, for example, approximately from 0.5 to 5 hours.

After completion of the reaction, the resulting reaction product can be separated and purified by a separation means, such as filtration, concentration, distillation, extraction, crystallization, adsorption, recrystallization, or column chromatography; or a separation means in combination of these.

In a case of producing a dopant containing, as the cation, a radical cation (hereinafter sometimes referred to as "radical cation (3b)") represented by Formula (3) where at least one of $R^{11}$ to $R^{13}$ is a group represented by Formula (r), an amine compound corresponding to the radical cation (3b) may be used in place of the amine compound corresponding to the radical cation (3a) in step [1] above.

The amine compound corresponding to the radical cation (3b) can be produced, for example, by subjecting a halide of a triarylamine to a coupling reaction (e.g., Sholl coupling reaction) using an oxidizer such as 2,3-dichloro-5,6-dicyano-1,4-benzoquinone (DDQ).

Conjugated Polymeric Compound Having Electron Donating Group Containing Heteroatom in Side Chain The conjugated polymeric compound having an electron donating group containing a heteroatom in a side chain is preferably a n-conjugated polymeric compound having an electron donating group containing a heteroatom in a side chain. The conjugated polymeric compound having the side chain is likely to be oxidized and is difficult to dedope, as compared to a conjugated polymeric compound without the side chain. In the present disclosure, a conductor material having excellent conductivity has been achieved by using a conjugated polymeric compound having an electron donating group containing a heteroatom in a side chain as a semiconductor that is doped with the dopant described above. The "conjugated polymeric compound" in the present specification includes an oligomer.

Above all, the backbone of the conjugated polymeric compound is preferably a heterocyclic conjugated polymeric compound from the perspective of having high crystallinity, particularly preferably a heterocyclic conjugated polymeric compound containing a nitrogen atom or a sulfur atom as a heteroatom, particularly preferably a conjugated polymeric compound containing a heterocycle containing a sulfur atom, especially preferably a conjugated polymeric compound containing a thiophene ring structure such as a thiophene ring, a benzothiophene ring, or a thienothiophene ring.

The conjugated polymeric compound is preferably a polymeric compound having a repeating unit represented by Formula (2) below:

[Chem. 19]

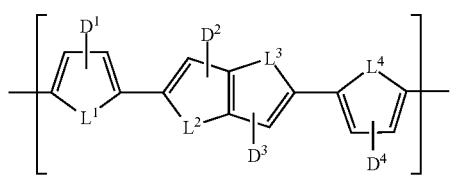

(2)

where $L^1$ to $L^4$ are identical or different, and each represent an element of Groups 13 to 16; and $D^1$ to $D^4$ are identical or different, and each represent an electron donating group containing a heteroatom, or a hydrogen atom, provided that at least one of $D^1$ to $D^4$ is an electron donating group containing a heteroatom.

The conjugated polymeric compound is particularly preferably a polymeric compound having a repeating unit represented by Formula (2a) or (2b) below, and especially preferably a polymeric compound having a repeating unit represented by Formula (2b) below.

[Chem. 20]

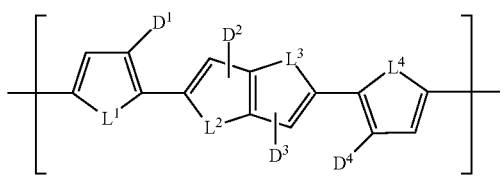

(2a)

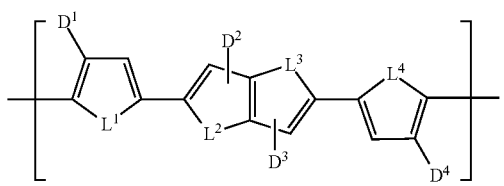

(2b)

In the above formula, $L^1$ to $L^4$ are identical or different, and each represent an element of Groups 13 to 16; and $D^1$ to $D^4$ are identical or different, and each represent an electron donating group containing a heteroatom, or a hydrogen atom, provided that at least one of $D^1$ to $D^4$ is an electron donating group containing a heteroatom.

Examples of the elements of Groups 13 to 16 include boron atoms, nitrogen atoms, oxygen atoms, phosphorus atoms, and sulfur atoms. Among them, the element of Group 15 or 16 is preferable, and a sulfur atom is particularly preferable.

Examples of the electron donating group containing the heteroatom include a group containing at least one heteroatom selected from the elements of Groups 14 to 16.

Among them, the electron donating group containing the heteroatom is preferably a group represented by Formula (d) below. The reason for this is as follows. In the conjugated polymeric compound having a group represented by Formula (d) below in a side chain, the anion released from the ionic bond with the counter cation can be stably placed in a gap of the crystalline structure constituted by the side chain the crystalline structure, and thus dedoping can be suppressed, and a state with high conductivity can be maintained stably over time.

[Chem. 21]

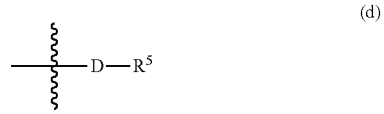

(d)

where D represents at least one heteroatom selected from elements of Groups 14 to 16; $R^5$ represents an aliphatic hydrocarbon group having from 5 to 30 carbon atoms; and a bond indicated by a wavy line in the formula is bonded to a backbone of the conjugated polymeric compound.

Examples of at least one heteroatom selected from the elements of Groups 14 to 16 include a nitrogen atom, an oxygen atom, a phosphorus atom, and a sulfur atom. Among them, the element of Group 15 or 16 is preferable, and an oxygen atom is particularly preferable.

Examples of the aliphatic hydrocarbon group having from 5 to 30 carbon atoms in $R^5$ include alkyl groups having from 5 to 30 carbon atoms, such as a pentyl group, a hexyl group, a decyl group, a dodecyl group, a hexadecyl group, and a nonadecyl group; and alkenyl groups having from 5 to 30 carbon atoms such as an oleyl group (preferably from 10 to 30 carbon atoms, more preferably from 10 to 20 carbon atoms, particularly preferably from 10 to 18 carbon atoms, and most preferably from 12 to 18 carbon atoms).

Among them, the aliphatic hydrocarbon group having from 5 to 30 carbon atoms in $R^5$ is preferably an alkyl group having from 5 to 30 carbon atoms, more preferably an alkyl group having from 5 to 20 carbon atoms, particularly an alkyl group having from 10 to 20 carbon atoms, most preferably an alkyl group having from 10 to 18 carbon atoms, and especially preferably an alkyl group having from 12 to 15 carbon atoms.

In the conjugated polymeric compound having an electron donating group containing a heteroatom in a side chain, a content proportion of the side chain is, for example, from 1 to 4 (preferably from 2 to 4, and particularly preferably from 2 to 3) per repeating unit (preferably, repeating unit represented by Formula (2) above).

Method for Producing Conjugated Polymeric Compound Having Electron Donating Group Containing Heteroatom in Side Chain As the conjugated polymeric compound having an electron donating group containing a heteroatom in a side chain, for example, a conjugated polymeric compound having a repeating unit represented by Formula (2a) below can be produced via the following reactions (I) and (II).

[Chem. 22]

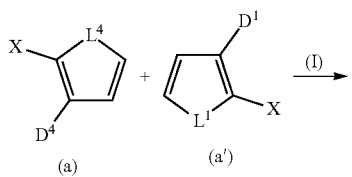

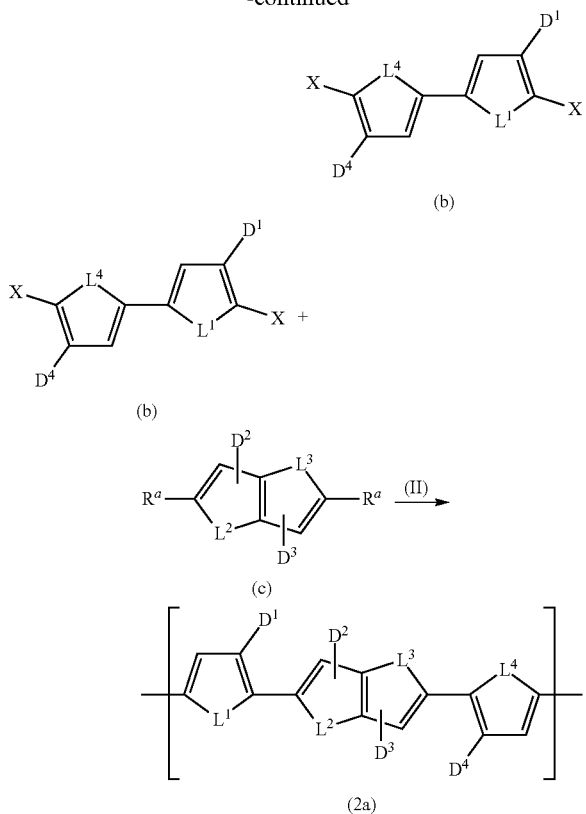

(2a)

$D^1$ to $D^4$ and $L^1$ to $L^4$ in the above formulas are the same as described above. X represents a halogen atom.

In the reaction (I), a compound represented by Formula (a) above and a compound represented by Formula (a') above are reacted to yield a compound represented by Formula (b) above.

The reaction (I) is preferably carried out in the presence of a silver catalyst and/or a base. Further, the reaction is preferably carried out in the presence of a palladium complex and/or a ligand.

Examples of the silver catalyst include silver salts such as silver oxide, silver carbonate, silver nitrate, silver sulfate, silver cyanide, silver chloride, silver bromide, silver iodide, silver acetate, silver benzoate, and silver lactate; and silver complexes such as silver acetylacetonate. One of these can be used alone or two or more in combination.

An amount of the silver catalyst used is, for example, approximately from 0.05 to 5.0 mol per mol of a total of the compound represented by Formula (a) above and the compound represented by Formula (a') above.

Examples of the base include organic bases such as triethylamine, tri-n-propylamine, tri-n-butylamine, tri-s-butylamine, tri-t-butylamine, diisopropylethylamine, dimethylcyclohexylamine, dicyclohexylethylamine, tribenzylamine, N-methylpiperidine, N,N-dimethylaniline, N,N-diethylaniline, 1,4-diazabicyclo[2.2.2]octane, tetramethylethylenediamine, 1,4-dimethylpiperazine, N-methylpyrrolidine, N-methylmorpholine, 1-methyl-2,2,6,6-tetramethylpiperidine, 1,5-diazabicyclo[4.3.0]-5-nonene, 1,8-diazabicyclo[5.4.0]-7-undecene, pyridine, 2,4-dimethylpyridine, 2,4,6-trimethylpyridine, 4-dimethylaminopyridine, and 2,6-di-t-butylpyridine; and alkali metal alkoxides such as sodium methoxide, sodium ethoxide, and potassium t-butoxide; alkali metal carbonates such as sodium hydrogen carbonate, sodium carbonate, potassium carbonate, rubidium carbonate, and cesium carbonate; alkali metal phosphates such as potassium phosphate; alkali metal hydroxides such as lithium hydroxide, sodium hydroxide, and potassium hydroxide; metal amides such as lithium diisopropylamide; and halides of alkali metals such as potassium fluoride, potassium iodide, sodium fluoride, and cesium fluoride. One of these can be used alone or two or more in combination.

An amount of the base used is approximately from 0.5 to 5.0 mol per mol of a total of the compound represented by Formula (a) above and the compound represented by Formula (a') above.

Examples of the palladium catalyst include zero-valent palladium compounds such as tetrakistriphenylphosphine palladium, bis(1,5-cyclooctadiene)palladium, bis(triphenylphosphine)(maleic anhydride)palladium, tris(dibenzylideneacetone)dipalladium, and (1,5-cyclooctadiene)(maleic anhydride)palladium; and divalent palladium compounds such as palladium acetate, palladium propionate, palladium carbonate, palladium benzoate, palladium acetylacetonate, palladium chloride, palladium sulfate, palladium nitrate, lithium palladium chloride, bisbenzonitrile palladium chloride, bistriphenylphosphine palladium chloride, bistriphenylphosphine palladium acetate, π-allylpalladium chloride, π-allylpalladium acetate, and sodium tetrachloroparadate. One of these can be used alone or two or more in combination.

An amount of the palladium catalyst used is, for example, approximately from 1 to 10 mol % the compound represented by Formula (a) above and the compound represented by Formula (a') above.

The reaction (I) can be performed in the presence of a solvent. Examples of the solvent include nitrile-based solvents such as acetonitrile, propionitrile, and benzonitrile; water; alcohol-based solvents such as methanol; amide-based solvents such as N,N-dimethylformamide and N,N-dimethylacetamide; ether-based solvents such as diethyl ether, THF, and dioxane; ester-based solvents such as ethyl acetate; dimethylformamide and dimethylsulfoxide. One of these can be used alone or two or more in combination.

A reaction atmosphere in the reaction (I) is any atmosphere that does not inhibit the reaction and not particularly limited, and may be, for example, any of an air atmosphere, a nitrogen atmosphere, and an argon atmosphere.

A reaction temperature of the reaction (I) is, for example, approximately from to 100° C. A reaction time is, for example, approximately from 0.5 to 5 hours.

The reaction (II) is a cross-coupling reaction between the compound represented by Formula (b) above and a compound represented by Formula (c) above. As the cross-coupling reaction, for example, a Stille cross-coupling reaction, a Kumada cross-coupling reaction, a Negishi cross-coupling reaction, a Suzuki cross-coupling reaction, or the like can be used. Through this reaction, the conjugated polymeric compound having the repeating unit represented by Formula (2a) above is obtained.

The compound represented by Formula (c) above can be selected and used depending on the type of cross-coupling reaction used.

For example, when the Stille cross-coupling reaction is utilized, the compound represented by Formula (c) is an organotin compound, and $R^a$ in Formula (c) is a trialkylstannyl group ($SnR_3$ group; R is, for example, an alkyl group having from 1 to 3 carbon atoms).

When the Kumada cross-coupling reaction is utilized, the compound represented by Formula (c) is a magnesium compound, and $R^a$ in Formula (c) is a magnesium halide group (—MgX group; X represents a halogen atom).

When the Negishi cross-coupling reaction is utilized, the compound represented by Formula (c) is a zinc compound, and $R^a$ in Formula (c) is a ZnX group (X represents a halogen atom).

When the Suzuki cross-coupling reaction is utilized, the compound represented by Formula (c) is a boron compound, and $R^a$ in Formula (c) is a $BY_2$ group (Y is, for example, a hydroxyl group).

An amount of the used compound represented by Formula (c) above is, for example, approximately from 1.0 to 1.5 mol per mol of the compound represented by Formula (b) above.

The reaction (II) is preferably carried out in the presence of a palladium catalyst and/or a ligand.

Examples of the palladium catalyst include $Pd(PPh_3)_4$, $Pd(dba)_2$, $Pd_2(dba)_3$, $Pd_2(dba)_3 \cdot CHCl_3$, $Pd(t-Bu_3P)_2$, and $Pd(acac)_2$. One of these can be used alone or two or more in combination.

The amount of the palladium catalyst used is, for example, approximately from 0.5 to 10 mol % of the compound represented by Formula (b above).

The ligand is preferably a phosphine ligand. Examples of the phosphine ligand include trialkyl phosphines such as trimethylphosphine and tri(t-butyl)phosphine; and tricycloalkylphosphines such as tri(cyclohexyl)phosphine; and aromatic phosphines such as tri(o-tolyl)phosphine, dimethylphenylphosphine, and diphenyl-2-pyridinylphosphine. One of these can be used alone or two or more in combination.

The amount of the ligand used is, for example, approximately from 1 to 15 mol % of the compound represented by Formula (b) above.

The reaction (II) can be performed in the presence of a solvent. Examples of the solvent include aromatic hydrocarbons such as benzene, toluene, xylene, ethylbenzene, trifluorotoluene, chlorobenzene, anisole, benzonitrile, nitrobenzene, and ethyl benzoate; aliphatic hydrocarbons such as hexane, heptane, and octane; alicyclic hydrocarbons such as cyclohexane; haloalkanes such as carbon tetrachloride, chloroform, dichloromethane, and 1,2-dichloroethane; ketones such as acetone and methyl ethyl ketone; esters such as methyl acetate, ethyl acetate, isopropyl acetate, and butyl acetate; amides such as N,N-dimethylformamide and N,N-dimethylacetamide; nitriles such as acetonitrile and propionitrile; chain or cyclic ethers such as diethyl ether, dibutyl ether, dimethoxyethane, dioxane, and tetrahydrofuran; and organic acids such as acetic acid. One of these can be used alone or two or more in combination.

A reaction atmosphere in the reaction (II) is any atmosphere that does not inhibit the reaction and not particularly limited, and may be, for example, any of an air atmosphere, a nitrogen atmosphere, and an argon atmosphere.

A reaction temperature of the reaction (II) is, for example, approximately from room temperature (25° C.) to 200° C. A reaction time is, for example, approximately from 1 to 72 hours.

As the conjugated polymeric compound having an electron donating group containing a heteroatom in a side chain, for example, a conjugated polymeric compound having a repeating unit represented by Formula (2b) below can be produced via the following reactions (III) and (IV).

[Chem. 23]

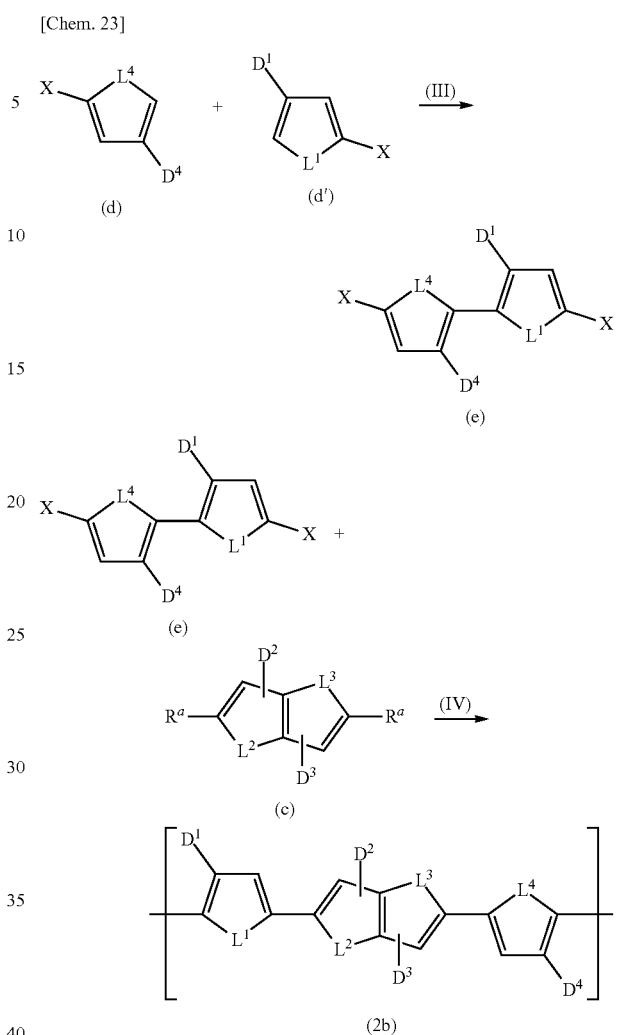

$D^1$ to $D^4$, $L^1$ to $L^4$, X, and $R^a$ in the above formulas are the same as described above.

In the reaction (III), a compound represented by Formula (d) above and a compound represented by Formula (d') above are reacted to yield a compound represented by Formula (e) above.

The reaction (III) is preferably carried out in the presence of a copper catalyst and/or a base.

Examples of the copper catalyst include monovalent or divalent copper halides such as copper (I) iodide, copper (II) iodide, copper (I) bromide, copper (II) bromide, copper (I) chloride, copper (II) chloride, copper (I) fluoride, and copper (II) fluoride; and copper salts of monovalent or divalent protonic acids such as copper (I) oxide, copper (II) oxide, copper (I) sulfate, copper (II) sulfate, copper (I) carbonate, copper (II) carbonate, copper (I) acetate, copper (II) acetate, copper (I) nitrate, copper (II) nitrate, copper (I) methanesulfonate, copper (II) methanesulfonate, copper (I) trifluoromethanesulfonate, copper (II) trifluoromethanesulfonate, copper (I) cyanide, and copper (II) cyanide. One of these can be used alone or two or more in combination.

An amount of the copper catalyst used is, for example, approximately from 0.05 to 1 mol per mol of a total of the compound represented by Formula (d) above and the compound represented by Formula (d') above.

Examples of the base include the same examples as those which can be used in the reaction (I). One of the bases can be used alone or two or more in combination.

An amount of the base used is approximately from 0.5 to 5.0 mol per mol of a total of the compound represented by Formula (d) above and the compound represented by Formula (d') above.

The reaction (III) can be performed in the presence of a solvent. Examples of the solvent include the same examples as those which can be used in reaction (I). One of the solvents can be used alone or two or more in combination.

A reaction atmosphere in the reaction (III) is any atmosphere that does not inhibit the reaction and not particularly limited, and may be, for example, any of an air atmosphere, a nitrogen atmosphere, and an argon atmosphere.

A reaction temperature of the reaction (III) is, for example, approximately from −100 to 10° C. A reaction time is, for example, approximately from 0.5 to 5 hours.

The reaction (IV) is a cross-coupling reaction between the compound represented by Formula (e) above and a compound represented by Formula (c) above. The reaction (IV) can be carried out in a similar manner as in the reaction (II), except that the compound represented by Formula (e) above is used instead of the compound represented by Formula (b) above.

Electronic Device

The electronic device according to an embodiment of the present disclosure is provided with the conductor material.

Examples of the electronic device include switching elements, diodes, transistors, photoelectric conversion devices, solar cells, and photoelectric conversion elements (e.g., solar cell elements and organic electroluminescence elements).

The electronic device includes the conductor material, and thus, has both high electrical conductivity and high stability (stability against heat, water, electricity, and the like). In addition, weight reduction, flexibility, thickness reduction, and area increase can be realized at low cost.

Each of the configurations, their combinations, and the like of the present disclosure above is an example, and addition, omission, substitution, and change of the configuration can be appropriately made without departing from the gist of the present disclosure.

EXAMPLES

Hereinafter, the present disclosure will be described more specifically with reference to examples, but the present disclosure is not limited by these examples, and is limited only by the claims.

Preparation Example 1 (Preparation of Dopant)

Bis(trifluoromethanesulfonyl)imide silver (AgTFSI, 3.51 mmol), tris(4-bromophenyl)amine (2.51 mmol), and diethyl ether (100 mL) were mixed and stirred for 20 minutes. Thereafter, the mixture was cooled to −36° C.

A mixed solution of iodine (2.51 mmol)/diethyl ether (30 mL) was added dropwise to the mixture over 15 minutes, and then the temperature was raised to room temperature. A precipitate was collected by filtration and dried under reduced pressure at room temperature for 2 hours to yield a dopant (1) represented by the following formula.

[Chem. 24]

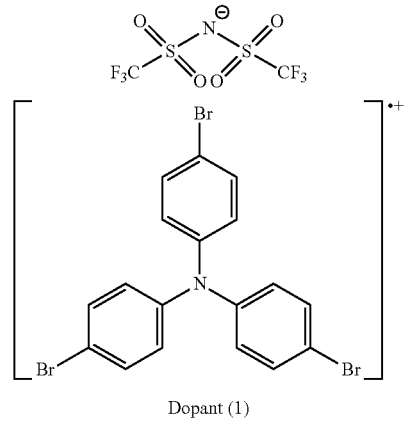

Dopant (1)

Preparation Example 2 (Preparation of Conjugated Polymeric Compound 1 Having Electron Donating Group Containing Heteroatom in Side Chain)

In the presence of toluene in an amount to achieve a concentration of 0.5 M against a substrate and p-toluenesulfonic acid monohydrate in an amount of 5 mol % against the substrate, 1.1 mol equivalent of 1-tridecanol was reacted with 3-methoxythiophene as the substrate under reflux for 4 hours to yield 3-tridecyloxythiophene (yield: 92%).

In the presence of THF in an amount to achieve a concentration of 0.5 M against a substrate, 1.0 mol equivalent of NBS was reacted with 3-tridecyloxythiophene as the substrate at 0° C. for 30 minutes to yield 2-bromo-4-tridecyloxythiophene (yield: 97%).

In the presence of THF in an amount to a achieve a concentration of 0.1 M against a substrate, 1 mol equivalent of lithium diisopropylamide and 1 mol equivalent of copper (II) chloride were mixed with 2-bromo-4 tridecyloxythiophene as the substrate at −78° C., and then the temperature was raised to 25° C. Then, they were reacted for 12 hours while the temperature was maintained at 25° C. to yield 5,5'-dibromo-3,3'-tridecyloxy-2,2'-bithiophene (yield: 73%).

In the presence of chlorobenzene in an amount to achieve a concentration of 0.05 M against a substrate, $Pd_2(dba)_3 \cdot CHCl_3$ in an amount of 2.0 mol % against the substrate, and 8.0 mol % of tri(o-tolyl)phosphine against the substrate, 5,5'-dibromo-3,3'-tridecyloxy-2,2'-bithiophene as the substrate and 2,5-bis(trimethylstannyl)thieno[3,2-b]thiophene were reacted with each other under microwave irradiation. This resulted in a conjugated polymeric compound 1 having a repeating unit represented by Formula (2-1) below.

[Chem. 25]

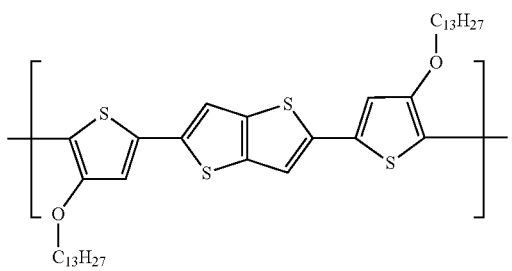

(2-1)

Preparation Example 3 (Preparation of Conjugated Polymeric Compound 2 Having Electron Donating Group Containing Heteroatom in Side Chain)

In a similar manner as in Preparation Example 2, 3-tridecyloxythiophene was obtained.

In the presence of THE in an amount to achieve a concentration of 0.5 M against a substrate, 1.0 mol equivalent of NBS was reacted with 3-tridecyloxythiophene as the substrate at 0° C. for 30 minutes to yield 2-bromo-3-tridecyloxythiophene (yield: 99%).

In the presence of THE in an amount to achieve a concentration of 0.1 M against a substrate, 2 mol equivalent of silver nitrate, 2 mol equivalent of potassium fluoride, and 5 mol % of $PdCl_2(phCN)_2$ were mixed with 2-bromo-3-tridecyloxythiophene as the substrate at room temperature, and then the temperature was raised to 70° C. Then, they were reacted for 3 hours while the temperature was maintained at 70° C. to yield 5,5'-dibromo-4,4'-tridecyloxy-2,2'-bithiophene (yield: 73%).

In the presence of chlorobenzene in an amount to achieve a concentration of 0.05 M against a substrate, $Pd_2(dba)_3 \cdot CHCl_3$ in an amount of 2.0 mol % against the substrate, and 8.0 mol % of tri(o-tolyl)phosphine against the substrate, 5,5'-dibromo-4,4'-tridecyloxy-2,2'-bithiophene as the substrate and 2,5-bis(trimethylstannyl)thieno[3,2-b]thiophene were reacted with each other under microwave irradiation. This resulted in a conjugated polymeric compound 2 having a repeating unit represented by Formula (2-2) below.

[Chem. 26]

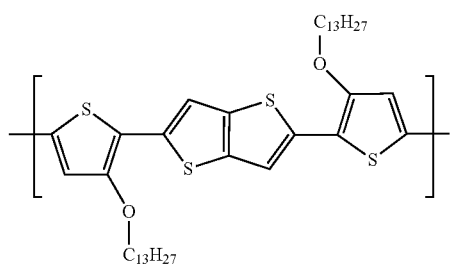

(2-2)

Example 1

The conjugated polymeric compound 1 obtained in Preparation Example 1 and o-dichlorobenzene were stirred at 150° C. for 1 hour under nitrogen atmosphere to prepare a solution 1 containing the conjugated polymeric compound 1 having a concentration of 0.5 mass %.

The obtained solution 1 was spin-coated (500 rpm×5 sec, then 3000 rpm×60 sec) on a glass substrate provided with an electrode [Cr (3 nm)/Au (30 nm)], dried at 150° C. for 30 minutes, and further annealed at 180° C. for 30 minutes to obtain a film 1 having an average thickness of 50 nm.

The obtained film 1 was immersed in an acetonitrile solution (dopant concentration: 1.5 mmol/L) of the dopant (1) obtained in Preparation Example 1 at 60° C. for 10 minutes. After immersion, the film 1 was dried at 80° C. for 10 minutes to obtain a conductor material (1).

Example 2

A conductor material (2) was obtained in the same manner as in Example 1, except that the conjugated polymeric compound 2 obtained in Preparation Example 2 was used instead of the conjugated polymeric compound 1 obtained in Preparation Example 1.

Comparative Example 1

A conductor material (3) was obtained in the same manner as in Example 1, except that a conjugated polymeric compound 3 (trade name: "PBTTT-C 14", available from Sigma-Aldrich Co. LLC.) having a repeating unit represented by Formula (2-3) below was used instead of the conjugated polymeric compound 1 obtained in Preparation Example 1.

[Chem. 27]

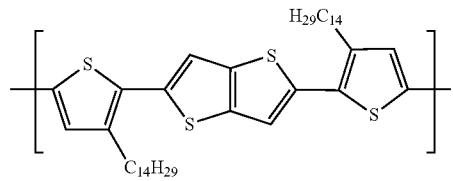

(2-3)

Doping Efficiency Evaluation

For the conductor materials (1) to (3) obtained in the Examples and the Comparative Example, ultraviolet visible near-infrared (UV-Vis-NIR) absorption spectra were measured in a range of from 200 to 2700 nm at an interval of 1 nm using an ultraviolet visible near-infrared spectrophotometer (available from JASCO Corporation). The results are illustrated in FIG. 1.

Furthermore, absorption spectra were similarly measured for the conjugated polymeric compounds before doping of the conductor materials (1) to (3). The results are illustrated in FIG. 2.

Figure 2:
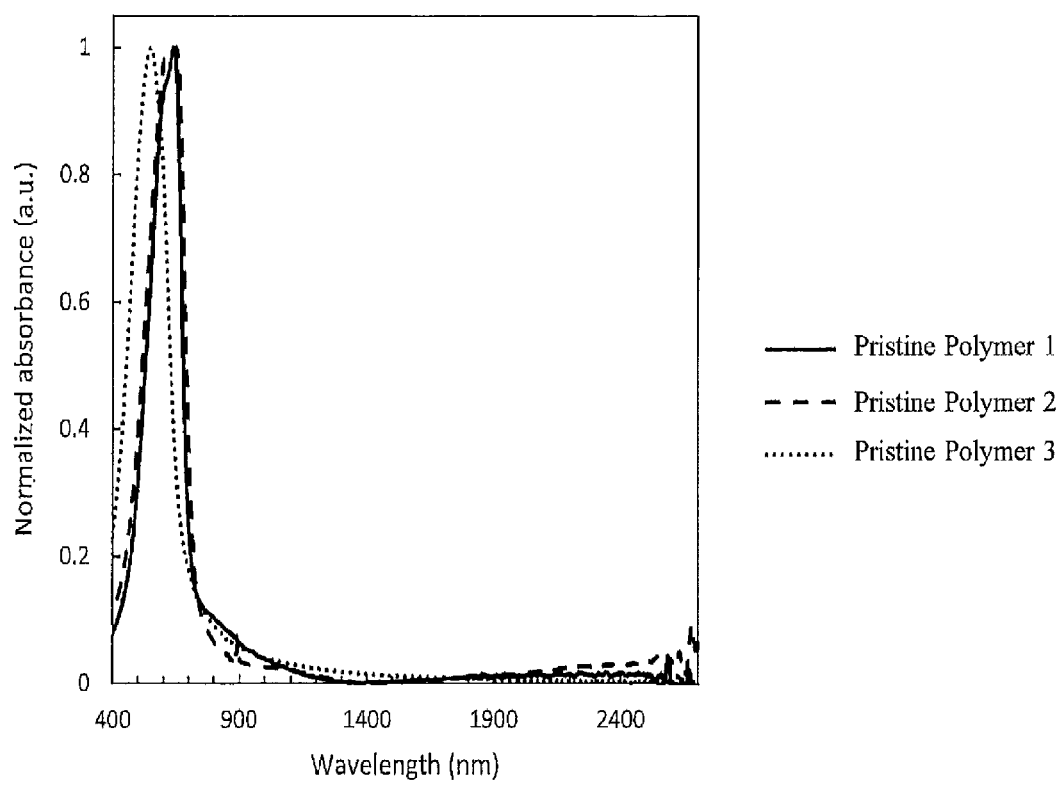
FIG. 2 is a diagram illustrating ultraviolet visible near-infrared absorption spectra of conjugated polymeric compounds used in the Examples and the Comparative Example (i.e. conjugated polymeric compounds before being doped with the dopant).

As can be seen from FIGS. 1 and 2, the conjugated polymeric compounds 1 and 2 each showed a large degree of decrease in the peak at around 500 nm, which was derived from the conjugated polymeric compound before being doped with the dopant, and increases in the peaks at around from 1200 to 2500 nm, which were derived from the conjugated polymeric compound after being doped with the dopant, as compared with the conjugated polymeric compound 3. From these results, it can be seen that the conjugated polymeric compounds 1 and 2 were more readily oxidized than the conjugated polymeric compound 3, and that the conductor materials (1) and (2) were excellent in doping efficiency as compared with the conductor material (3).

Conductivity Evaluation

The conductance (S) and conductivity (S/cm) of the conductor material (1) (doped film thickness: 64.3 nm) were measured under the following conditions, using "Keiythley 2612B SouseMeter" available from Keiythley.

Measurement Conditions

Sweeping voltage: from −0.1 to 0.1 V (0.01 V/step)

Wiring width (W): 612 μm

Channel length (L): 500, 200, or 100 μm

The result is shown in the following table.

TABLE 1

| W (μm) | L (μm) | Conductance (S) | Conductivity (S/cm) |
|---|---|---|---|
| 612 | 500 | 0.00243 | 313 |
| 612 | 200 | 0.00617 | 318 |
| 612 | 100 | 0.01137 | 293 |

The conductance (S) and conductivity (S/cm) of the conductor material (2) (doped film thickness: 33 nm) were measured in a similar manner as in the (conductivity evaluation) of the conductor material (1), except that the wiring width (W) was 2000 μm. The result is shown in the following table.

TABLE 2

| W (μm) | L (μm) | Conductance (S) | Conductivity (S/cm) |
|---|---|---|---|
| 2000 | 100 | 0.000358 | 109 |
| 2000 | 200 | 0.000437 | 133 |
| 2000 | 500 | 0.000428 | 130 |

It can be seen, from Tables 1 and 2, that an electronic device including the conductor material (1) or the conductor material (2) had a high conductivity in a stable manner even when the channel length (L) was changed.

Conductivity Stability Evaluation

For the conductor material (1), the conductivities immediately after preparation (storage period: 0 days) and after storage for 14 days, 28 days, 42 days, or 56 days under the condition of room temperature (25° C.) were measured in a similar manner as in the (Conductivity evaluation). The result is shown in Table 3 below.

TABLE 3

| | Storage period (Day) | Conductivity (S/cm) | Ratio of decrease in conductivity (%) |
|---|---|---|---|
| (Conductor material) (1) | 0 | 318 | — |
| | 14 | 316 | 0.6 |
| | 28 | 313 | 1.6 |
| | 42 | 293 | 7.9 |
| | 56 | 287 | 9.7 |

From Table 3, it can be seen that dedoping in the conductor material according to an embodiment of the present disclosure was suppressed over time and could maintain high conductivity even after storage for a long period of time.

As a summary of the above, configurations and variations of the present disclosure are described below.

[1] A conductor material having a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation.

[2] The conductor material according to [1], wherein the anion is represented by Formula (1).

[3] The conductor material according to [1], wherein the anion is represented by Formula (1a).

[4] The conductor material according to any one of [1] to [3], wherein the counter cation is a radical cation represented by Formula (3).

[5] The conductor material according to any one of [1] to [4], wherein the conjugated polymeric compound is a π-conjugated polymeric compound having an electron donating group containing a heteroatom in a side chain.

[6] The conductor material according to any one of [1] to [4], wherein the conjugated polymeric compound is a heterocyclic conjugated polymeric compound.

[7] The conductor material according to any one of [1] to [4], wherein the conjugated polymeric compound is a heterocyclic conjugated polymeric compound containing a nitrogen atom or a sulfur atom as the heteroatom.

[8] The conductor material according to any one of [1] to [4], wherein the conjugated polymeric compound is a conjugated polymeric compound including a thiophene ring structure.

[9] The conductor material according to any one of [1] to [4], wherein the conjugated polymeric compound is a polymeric compound having a repeating unit represented by Formula (2).

[10] The conductor material according to any one of [1] to [4], wherein the conjugated polymeric compound is a polymeric compound having a repeating unit represented by Formula (2a) or a repeating unit represented by Formula (2b).

[11] The conductor material according to any one of [1] to [10], wherein the electron donating group containing a heteroatom is a group represented by Formula (d).

[12] The conductor material according to any one of [1] to [11], wherein the conjugated polymeric compound is a polymeric compound having a repeating unit represented by Formula (2), and a content proportion of the electron donating group containing a heteroatom is from 1 to 4 per repeating unit represented by Formula (2).

[13] The conductor material according to any one of [1] to [12], which is a p-type conductor material.

[14] The conductor material according to any one of [1] to [13], wherein a conductivity under the following measurement conditions is 250 S/cm or greater:

Measurement Conditions
 Film thickness of the conductor material: 64.3 nm;
 Sweeping voltage: from −0.1 to 0.1 V (0.01 V/step)
 Wiring width: 612 μm; and
 Channel length: 500 μm.

[15] The conductor material according to any one of [1] to [14], wherein a ratio of decrease in conductivity when the conductor material is stored at 25° C. for 14 days is 5% or less.

[16] The conductor material according to any one of [1] to [15], wherein a ratio of decrease in conductivity when the conductor material is stored at 25° C. for 56 days is 20% or less.

[17] A method for producing a conductor material, including doping a conjugated polymeric compound having an electron donating group containing a heteroatom in a side chain with a dopant containing an anion selected from a nitrogen anion, a boron anion, a phosphorus anion and an antimony anion, and a counter cation, to produce the conductor material described in any one of [1] to [16].

[18] The method for producing a conductor material according to [17], wherein the anion is represented by Formula (1).

[19] The method for producing a conductor material according to [17], wherein the anion is represented by Formula (1a).

[20] The method for producing a conductor material according to any one of [17] to [19], wherein the conjugated polymeric compound is a π-conjugated polymeric compound having an electron donating group containing a heteroatom in a side chain.

[21] The method for producing a conductor material according to any one of [17] to [19], wherein the conjugated polymeric compound is a heterocyclic conjugated polymeric compound.

[22] The method for producing a conductor material according to any one of [17] to [19], wherein the conjugated polymeric compound is a heterocyclic conjugated polymeric compound containing a nitrogen atom or a sulfur atom as the heteroatom.

[23] The method for producing a conductor material according to any one of [17] to [19], wherein the conjugated polymeric compound is a conjugated polymeric compound including a thiophene ring structure.

[24] The method for producing a conductor material according to any one of [17] to [19], wherein the conjugated polymeric compound is a polymeric compound having a repeating unit represented by Formula (2).

[25] The method for producing a conductor material according to any one of [17] to [19], wherein the conjugated polymeric compound is a polymeric compound having a repeating unit represented by Formula (2a) or a repeat unit represented by Formula (2b).

[26] The conductor material according to any one of [17] to [25], wherein the electron donating group containing a heteroatom is a group represented by Formula (d).

[27] The method for producing a conductor material according to any one of [17] to [26], wherein the counter cation contained in the dopant is a radical cation represented by Formula (3).

[28] An electronic device including the conductor material described in any one of [1] to [16].

INDUSTRIAL APPLICABILITY

The conductor material according to an embodiment of the present disclosure has a high dope amount, and is difficult to dedope. Also, the conductor material has high crystallinity and is flexible. The conductor material can be used to form a film by a simple method, and the conductor material with a large area can be easily made. Accordingly, the conductor material can be suitably used to manufacture an electronic device that is lightweight, thin, and flexible and has a large surface area while also suppressing costs.

The invention claimed is:

1. A conductor material having a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation, wherein the conjugated polymeric compound is a polymeric compound having a thieno-thiophene ring.

2. The conductor material according to claim 1, wherein the anion is represented by Formula (1):

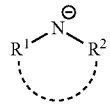

(1)

wherein $R^1$ and $R^2$ are identical or different, and each represent an electron withdrawing group; and $R^1$ and $R^2$ may be bonded to each other to form a ring with an adjacent nitrogen atom.

3. The conductor material according to claim 1, wherein the anion is represented by Formula (1a):

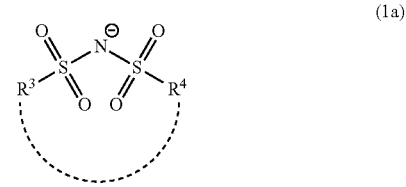

(1a)

wherein $R^3$ and $R^4$ are identical or different, and each represent a halogen atom or a haloalkyl group; and $R^3$ and $R^4$ may be bonded to each other to form a haloalkylene group.

4. The conductor material according to claim 1, wherein the conjugated polymeric compound is a polymeric compound having a repeating unit represented by Formula (2)

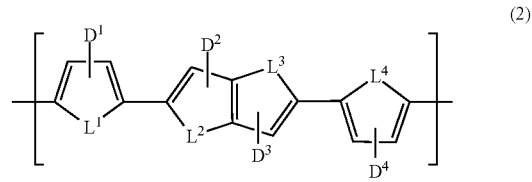

(2)

wherein $L^1$ and $L^4$ are identical or different, and each represent an element of Groups 13 to 16; $L^2$ and $L^3$ each represent a sulfur atom; and $D^1$ to $D^4$ are identical or different, and each represent an electron donating group containing a heteroatom, or a hydrogen atom, provided that at least one of $D^1$ to $D^4$ is an electron donating group containing a heteroatom.

5. The conductor material according to claim 1, wherein the electron donating group containing a heteroatom is a group represented by Formula (d):

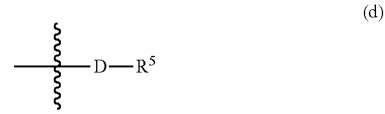

(d)

wherein D represents at least one heteroatom selected from elements of Groups 14 to 16; $R^5$ represents an aliphatic hydrocarbon group having from 5 to 30 carbon atoms; and a bond indicated by a wavy line in the formula is bonded to a backbone of the conjugated polymeric compound.

6. An electronic device comprising the conductor material described in claim 1.

7. A conductor material having a configuration in which a conjugated polymeric compound having an electron donating group containing a heteroatom in a side chain is doped with a dopant containing an anion and a counter cation, wherein the anion is represented by Formula (1a):

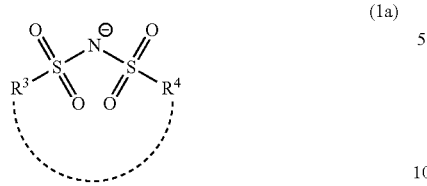

(1a)

wherein $R^3$ and $R^4$ are identical or different, and each represent a halogen atom or a haloalkyl group; and $R^3$ and $R^4$ may be bonded to each other to form a haloalkylene group.

8. A conductor material having a configuration in which a conjugated polymeric compound is doped with a dopant, wherein the conjugated polymeric compound is a polymeric compound having a repeating unit represented by Formula (2):

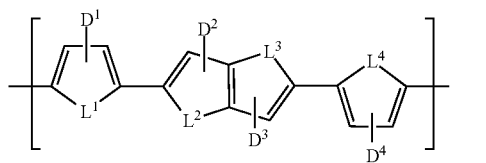

(2)

wherein $L^1$ to $L^4$ are identical or different, and each represent an element of Groups 13 to 16; and $D^1$ to $D^4$ are identical or different, and each represent an electron donating group containing a heteroatom, or a hydrogen atom, provided that at least one of $D^1$ to $D^4$ is an electron donating group containing a heteroatom; and the dopant is a dopant containing an anion selected from a nitrogen anion, a boron anion, a phosphorus anion and an antimony anion, and a counter cation.

9. A conductor material having a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation,
wherein the conductor material is a p-type conductor material.

10. A conductor material having a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation,
wherein a conductivity of the conductor material is 250 S/cm or greater, the conductivity being measured under the following measurement conditions:
film thickness of the conductor material: 64.3 nm;
sweeping voltage: from −0.1 to 0.1 V (0.01 V/step);
wiring width: 612 μm; and
channel length: 500 μm.

11. A conductor material having a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation,
wherein a conductivity of the conductor material is 250 S/cm or greater, and a ratio of decrease in conductivity when the conductor material is stored at 25° C. for 14 days is 5% or less, the conductivity being measured under the following measurement conditions:
film thickness of the conductor material: 64.3 nm;
sweeping voltage: from −0.1 to 0.1 V (0.01 V/step);
wiring width: 612 μm; and
channel length: 500 μm.

12. A conductor material having a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation,
wherein a ratio of decrease in conductivity when the conductor material is stored at 25° C. for 14 days is 5% or less, and a ratio of decrease in conductivity when the conductor material is stored at 25° C. for 56 days is 20% or less.

13. A conductor material having a configuration in which a conjugated polymeric compound having an electron donating group containing a heteroatom in a side chain is doped with a dopant containing an anion selected from a nitrogen anion, a boron anion, a phosphorus anion and an antimony anion, and a counter cation,
wherein the conjugated polymeric compound is a polymeric compound having a repeating unit represented by Formula (2b):

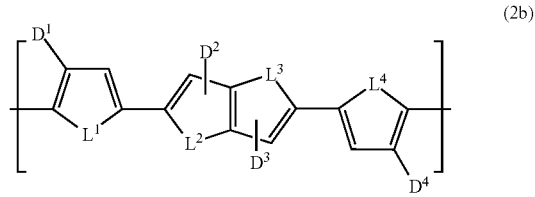

(2b)

wherein $L^1$ to $L^4$ each represent a sulfur atom; $D^1$ to $D^4$ are identical or different, and each represent a group represented by Formula (d) or a hydrogen atom, provided that at least one of $D^1$ to $D^4$ is a group represented by Formula (d):

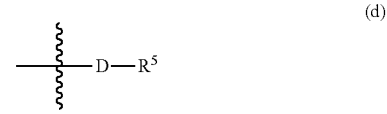

(d)

wherein D represents an oxygen atom; and $R^5$ represents an alkyl group having from 10 to 20 carbon atoms.

14. A method for producing a conductor material, the method comprising doping a conjugated polymeric compound having an electron donating group containing a heteroatom in a side chain with a dopant containing an anion selected from a nitrogen anion, a boron anion, a phosphorus anion and an antimony anion, and a counter cation, to produce the conductor material described in claim 1,
wherein the conjugated polymeric compound is a polymeric compound having a thienothiophene ring.

15. The method for producing a conductor material according to claim 14, wherein the anion is represented by Formula (1):

(1)

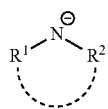

wherein $R^1$ and $R^2$ are identical or different, and each represent an electron withdrawing group; and $R^1$ and $R^2$ may be bonded to each other to form a ring with an adjacent nitrogen atom.

16. The method for producing a conductor material according to claim 14, wherein the anion is represented by Formula (1a):

(1a)

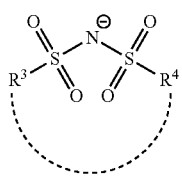

wherein $R^3$ and $R^4$ are identical or different, and each represent a halogen atom or a haloalkyl group; and $R^3$ and $R^4$ may be bonded to each other to form a haloalkylene group.

17. The method for producing a conductor material according to claim 14, wherein the conjugated polymeric compound is a polymeric compound having a repeating unit represented by Formula (2):

(2)

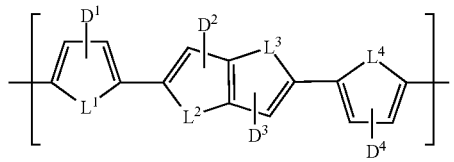

wherein $L^1$ and $L^4$ are identical or different, and each represent an element of Groups 13 to 16; $L^2$ and $L^3$ each represent a sulfur atom; and $D^1$ to $D^4$ are identical or different, and each represent an electron donating group containing a heteroatom, or a hydrogen atom, provided that at least one of $D^1$ to $D^4$ is an electron donating group containing a heteroatom.

18. The method for producing a conductor material according to claim 14, wherein the electron donating group containing a heteroatom is a group represented by Formula (d):

(d)

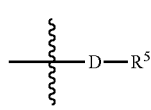

wherein D represents at least one heteroatom selected from elements of Groups 14 to 16; $R^5$ represents an aliphatic hydrocarbon group having from 5 to 30 carbon atoms; and a bond indicated by a wavy line in the formula is bonded to a backbone of the conjugated polymeric compound.

19. The method for producing a conductor material according to claim 14, wherein the counter cation contained in the dopant is a radical cation represented by Formula (3):

(3)

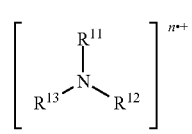

wherein $R^{11}$ to $R^{13}$ are identical or different, and each represent a monovalent aromatic group or a group represented by Formula (r); and n represents valence of the radical cation and is equal to the number (n) of nitrogen atoms in the formula:

(r)

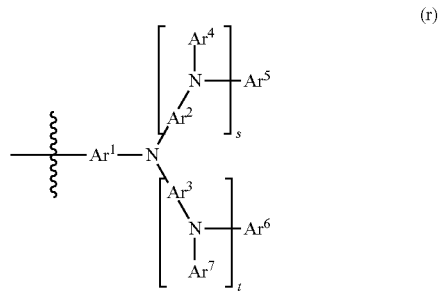

wherein $Ar^1$, $Ar^2$, and $Ar^3$ are identical or different, and each represent a divalent aromatic group; $Ar^4$, $Ar^5$, $Ar^6$, and $Ar^7$ are identical or different, and each represent a monovalent aromatic group which may have a substituent represented by Formula (sb); s and t are identical or different, and each represent an integer of 0 or more; and a bond indicated by a wavy line in the formula is bonded to the nitrogen atom in Formula (3), (sb)

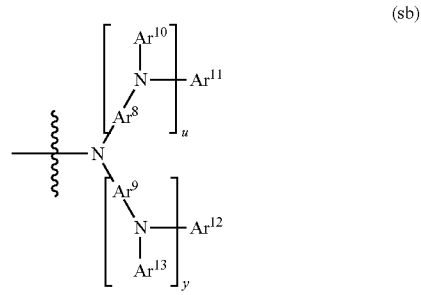

wherein $Ar^8$ and $Ar^9$ are identical or different, and each represent a divalent aromatic group; $Ar^{10}$, $Ar^{11}$, $Ar^{12}$, and $Ar^{13}$ are identical or different, and each represent a monovalent aromatic group; u and v are identical or different, and each represent an integer of 0 or more; and a bond indicated by a wavy line in the formula is bonded to the monovalent aromatic group.

* * * * *